United States Patent
Shiraishi et al.

(10) Patent No.: US 7,635,514 B2
(45) Date of Patent: Dec. 22, 2009

(54) REINFORCING MEMBER, PRODUCTION METHOD THEREFOR, AND ENGINE BLOCK

(75) Inventors: Toru Shiraishi, Yokohama (JP); Akihiro Katsuya, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 541 days.

(21) Appl. No.: 10/564,278

(22) PCT Filed: Jul. 1, 2004

(86) PCT No.: PCT/JP2004/009320

§ 371 (c)(1),
(2), (4) Date: Jan. 11, 2006

(87) PCT Pub. No.: WO2005/009649

PCT Pub. Date: Feb. 3, 2005

(65) Prior Publication Data

US 2006/0165967 A1   Jul. 27, 2006

(30) Foreign Application Priority Data

Jul. 23, 2003   (JP)   ............................ 2003-278022

(51) Int. Cl.
*B32B 3/20*   (2006.01)
*B32B 3/10*   (2006.01)
*B32B 3/18*   (2006.01)
*B32B 5/02*   (2006.01)
*B28B 23/02*   (2006.01)
*B28B 23/22*   (2006.01)
*B22D 19/02*   (2006.01)
*B22D 19/04*   (2006.01)
*B22D 19/14*   (2006.01)

(52) U.S. Cl. .............. 428/313.3; 428/293.1; 428/306.6; 428/615; 164/91; 164/98; 164/109; 264/299; 264/308

(58) Field of Classification Search ........................ None
See application file for complete search history.

(56) References Cited

U.S. PATENT DOCUMENTS 4,545,837 A   10/1985   Wehnert et al.

(Continued)

FOREIGN PATENT DOCUMENTS

DE   199 29 761 A1   1/2001

(Continued)

OTHER PUBLICATIONS

JP 2002-267015 English Machine Translation, Stoppek, Sep. 2002.*

(Continued)

*Primary Examiner*—Jennifer McNeil
*Assistant Examiner*—Jason L Savage
(74) *Attorney, Agent, or Firm*—Oliff & Berridge, PLC

(57) ABSTRACT

A portion of a reinforcing member has a stacked structure 102 in which plural iron plates having openings 106 are stacked. A hollow portion 107 is formed inside the stacked structure 102, so that the reinforcing member is reduced in weight. Porous bodies 103 composed of non-woven fabric of metal fibers are disposed on surfaces contacting matrixes, so that adhesion between the reinforcing member and the matrix is improved, and peeling therebetween is prevented. A cast product which is composed of light metal and has the above reinforcing member has a small thermal expansion. For example, the cast product is desirable for use for a journal portion of an engine block.

6 Claims, 5 Drawing Sheets

U.S. PATENT DOCUMENTS

| | | | |
|---|---|---|---|
| 4,603,071 A | | 7/1986 | Wehnert et al. |
| 4,942,762 A | * | 7/1990 | Schober et al. .......... 73/116.07 |
| 5,114,775 A | * | 5/1992 | Gsell et al. ................. 428/107 |
| 6,148,785 A | * | 11/2000 | Rivers et al. ............. 123/193.1 |
| 6,339,876 B1 | * | 1/2002 | Lee ......................... 29/888.02 |
| 6,647,945 B2 | * | 11/2003 | Harima ................... 123/195 R |
| 2002/0114824 A1 | | 8/2002 | Fukui et al. |
| 2003/0017053 A1 | * | 1/2003 | Baldwin et al. ......... 416/229 A |
| 2003/0180172 A1 | * | 9/2003 | Oda .............................. 419/5 |
| 2003/0203179 A1 | * | 10/2003 | Hawkins et al. .......... 428/297.4 |
| 2004/0096674 A1 | * | 5/2004 | Hansson ..................... 428/457 |

FOREIGN PATENT DOCUMENTS

| | | |
|---|---|---|
| EP | 1 048 378 A1 | 11/2000 |
| EP | 1 198 053 A1 | 4/2002 |
| JP | A 55-57368 | 4/1980 |
| JP | A-58-112648 | 7/1983 |
| JP | A-60-219436 | 11/1985 |
| JP | 62-067221 * | 3/1987 |
| JP | 62-240154 | 10/1987 |
| JP | A-05-337631 | 12/1993 |
| JP | A-06-012706 | 2/1994 |
| JP | U-06-012706 | 2/1994 |
| JP | 08-071728 | 3/1996 |
| JP | 08-260575 | 10/1996 |
| JP | 10-293114 | 11/1998 |
| JP | 11-269574 | 10/1999 |
| JP | A-2001-132534 | 5/2001 |

OTHER PUBLICATIONS

Himmer et al; "Formen aus paketierten Blechzuschnitten"; Der Stahlformenbauer; No. 4; Apr. 2003; pp. 36-39; XP009071616.
Himmer et al; "Lamination of metal sheets"; Computers in Industry; Elsevier Science Publishers; Jun. 1999; pp. 27-33; XP004164326.

* cited by examiner

R₁=57mm
R₂=51mm
R₃=39.5mm
R₄=33.5mm

REINFORCING MEMBER, PRODUCTION METHOD THEREFOR, AND ENGINE BLOCK

TECHNICAL FIELD

The present invention relates to a reinforcing member for reinforcing light metals used for automobile parts and airplane parts or the like.

BACKGROUND ART

In many fields of automobile parts and airplane parts, etc., aluminum alloys are used to reduce weight. Aluminum alloys are superior in weight reduction, but thermal expansions thereof are large when the aluminum alloys are exposed to high temperatures.

For example, a technique is known in which an engine block for automobile engines is composed of an aluminum alloy to reduce weight. The engine block has a journal portion (journal bearing portion) for supporting a crankshaft.

As described above, in the case in which the engine block is composed of aluminum alloy to reduce weight, the journal portion is desirably composed of an aluminum alloy. This is because in the case in which there is a difference in thermal expansion rate among members of the engine block, engine performance is restricted due to undesirable stress generated in the engine block when the temperature of the engine is increased.

During the rotation action of the engine, heat generated in the cylinder is conducted to the overall engine block, and the temperature of the journal portion reaches 100 to 150 degrees C. In the case in which the journal portion is composed of an aluminum alloy, the aluminum alloy of the journal portion is expanded by the above temperature increase, so that the diameter of the bearing is slightly large.

The crank shaft is composed of an iron-type material to ensure the rigidity thereof, and naturally has a thermal expansion rate lower than that of aluminum alloy. Even if the journal portion reaches the above temperatures, the expansion thereof is small. Due to this, as the temperature of the engine increases, a gap is formed between the journal portion and the crank shaft, so that noise and vibration increase during high speed rotation thereof.

Techniques for inhibiting the expansion of the aluminum alloy are disclosed in Patent Documents 1 to 3. In the technique disclosed in Patent Document 1, an iron material having small thermal expansion is integrally cast in the portion of a member composed of aluminum, wherein the portion is required to inhibit thermal expansion. In the technique disclosed in Patent Document 2, an iron material is integrally cast with aluminum alloy after being subjected to plating processing and annealing processing. In the technique disclosed in Patent Document 3, a metal-based composite material composed of a reinforcing material and a matrix is obtained, the matrix on the surface of the metal-based composite material is melted by heating, and the composite material is integrally cast with melted light alloy containing 1 mass % or more of magnesium.

Patent Document 1 is Japanese Patent Unexamined (KOKAI) Publication No. S60-219436, Patent Document 2 is Japanese Patent Unexamined (KOKAI) Publication No. S58-112648, and Patent Document 3 is Japanese Patent Unexamined (KOKAI) Publication No. H5-337631.

However, in the techniques disclosed in Patent Documents 1 to 3, there are the following problems which need to be overcome. In the technique disclosed in Patent Document 1, the thermal expansion is inhibited but the adhesion characteristic between the aluminum alloy material and the iron material which is as the reinforcing material is not good, and the iron material peels from the aluminum alloy material. Due to this, the obtained material has low strength as a composite material, and the thermal expansion inhibition effect is decreased by the peeling. As a result, when the obtained material is used for a structure of a journal portion, noise and vibration are easily generated. Since an iron material is used, the obtained material is heavy, so that this is undesirable to reduce weight.

In the technique disclosed in Patent Document 2, although the adhesion characteristic between the aluminum alloy material and the iron material which is as the reinforcing material is increased, the production cost is high since plating processing and annealing processing are further required. In the technique disclosed in Patent Document 3, the metal based composite material is required to be separately produced, and heating processing therefore is required, so that the production cost is high.

DISCLOSURE OF THE INVENTION

Problems Solved by the Invention

Therefore, an object of the present invention is to provide a technique which can obtain cast compound products at low cost, which have low thermal expansion, high strength, and light weight.

Means for Solving the Problems

According to one aspect of the present invention, a reinforcing member which is integrally cast with a cast metal includes: a material which is different from the cast metal; and a hollow portion. In this aspect of the present invention, since the hollow portion is formed in the reinforcing member, the weight of the reinforcing member can be reduced. Since thermal expansion does not occur in the hollow portion, thermal expansion of the reinforcing member can be inhibited, so that thermal expansion of a cast product which is integrally cast with the cast metal can be inhibited.

According to a preferred embodiment, the reinforcing member may include: a stacked structure having plated members; openings formed at the plated members, the openings forming the hollow portion; and members laminated on both surfaces of the stacked structure and covering the openings. In this embodiment of the present invention, since an arbitrary-shape can be formed by punching out the plated members, complicated shapes can be produced at low cost.

According to a preferred embodiment of the present invention, a portion of the reinforcing member or overall surfaces of the reinforcing member may be covered with a porous body. In this embodiment of the present invention, adhesion of the reinforcing member with the cast metal (matrix) is improved, and peeling of the reinforcing member from the cast metal is inhibited.

According to a preferred embodiment, a non-woven fabric or a woven fabric of metallic fiber, a porous material containing metallic particles, a porous material which is a mixture of metallic fibers and metallic particles, or a foamed metallic material can be used for the porous body. The porous body desirably has a melting point which is substantially equal to a material of the reinforcing member.

According to another aspect of the present invention, the reinforcing member of the present invention is desirably used for a journal portion of an engine block. The journal portion of the engine block is a bearing for supporting a crank shaft, and is required to have a high strength. The journal portion of the engine block is required to have a low thermal expansion since the journal portion of the engine block is exposed to high temperatures. Even when aluminum alloy is used, the reinforcing member of the present invention can have a high strength and have a low thermal expansion without compromising the light weight thereof, so that the reinforcing member is desirable for the above use.

According to another aspect of the present invention, a production method for a reinforcing member which is integrally cast with the cast metal includes: stacking plated members having openings; and laminating the plated members on an upper member and a lower member of the stacked plated members so as to cover the openings.

EFFECTS OF THE INVENTION

In the present invention, a hollow portion is provided in a reinforcing member which is integrally cast with a cast product, so that the reinforcing member can have light weight and low thermal expansion. Since the reinforcing member and the cast metal are difficult to separate from each other, the cast product can have high strength. In production for the reinforcing member, since the main member can be formed by punching out it without special processing, the production cost can be low.

Figure 1:
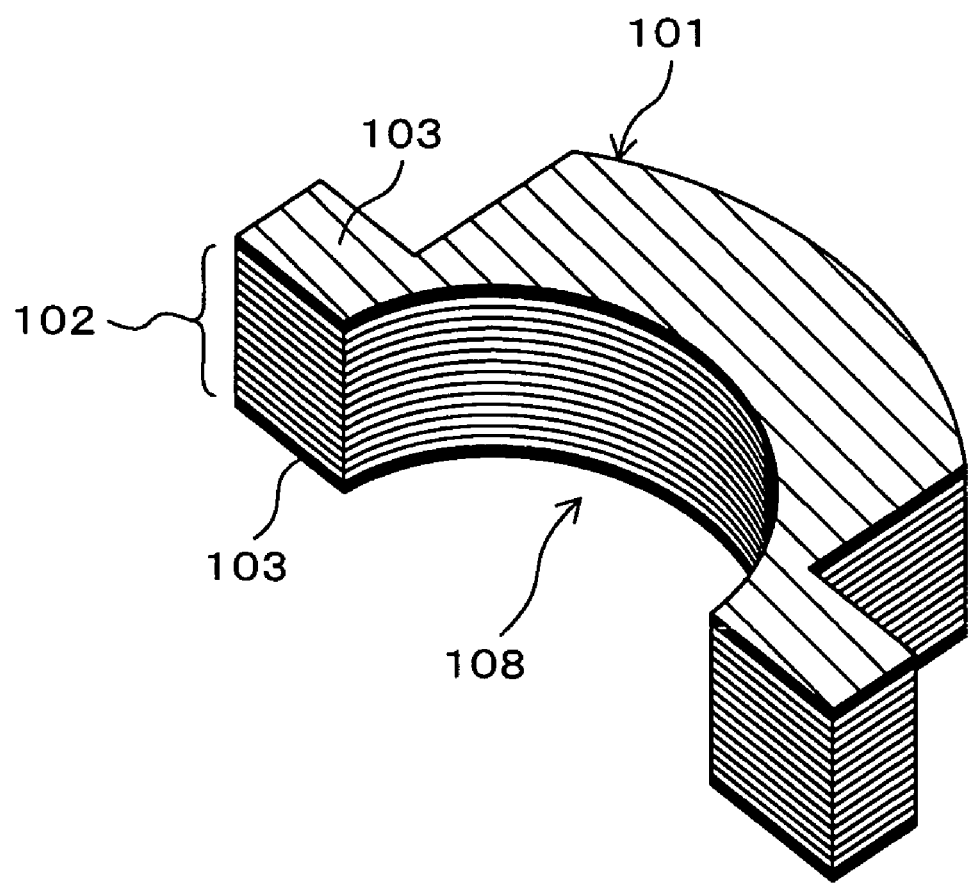
FIG. 1 is a schematic perspective view showing a reinforcing member of the present invention.

EXPLANATION OF REFERENCE NUMERALS 101 reinforcing member, 102 stacked structure, 103 porous body, 104 iron plate, 105 iron plate, 106 opening, 107 hollow portion, 108 bearing surface, 110 cast test body, 111 cast test body, 112 bolt, 114 evaluation sample, 120 a portion of an engine block, 121 reinforcing member, 122 journal portion

BEST MODE FOR CARRYING OUT THE INVENTION

1. Structure of Embodiment

Figure 2:
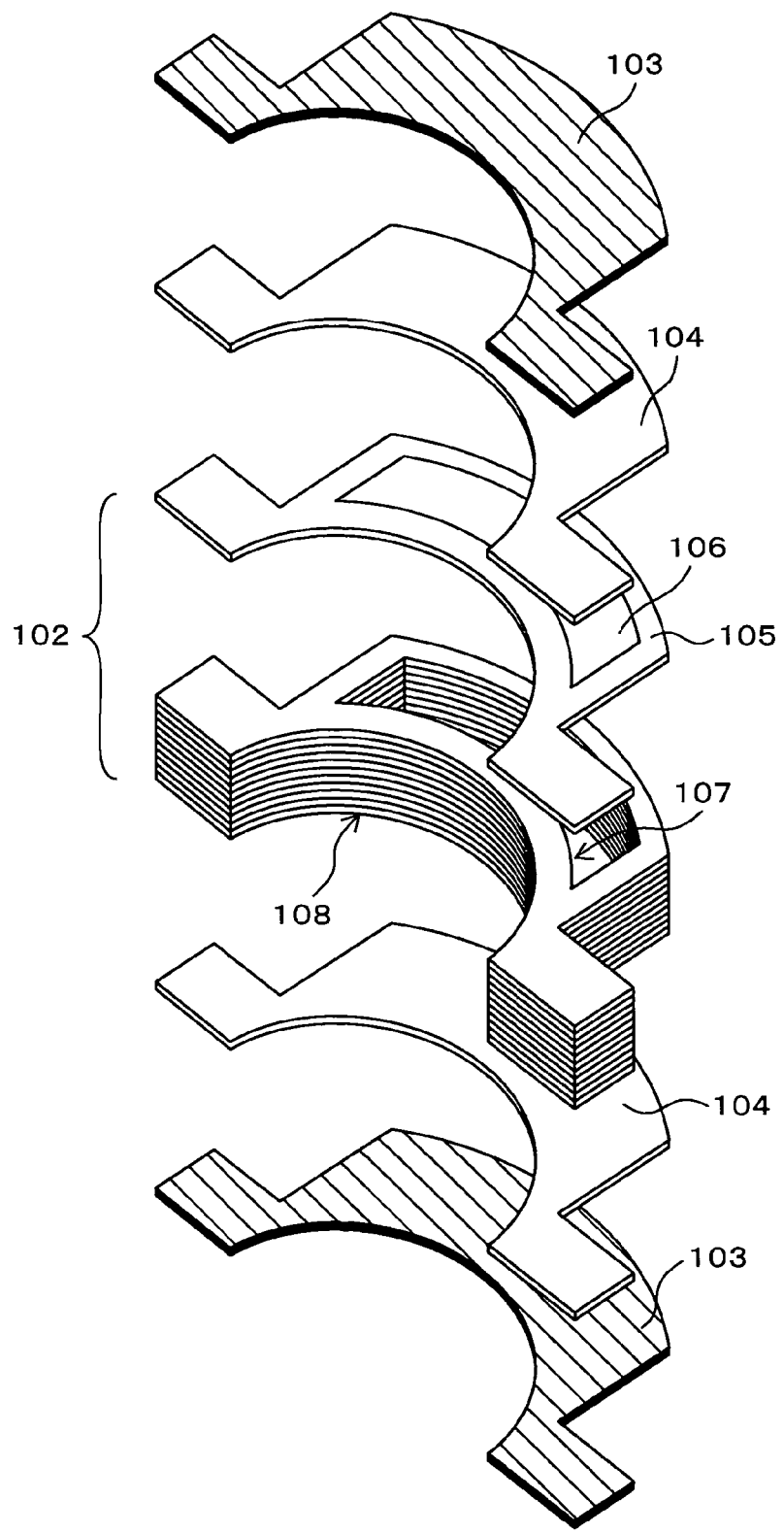
FIG. 2 is an exploded perspective view showing an exploded condition of a reinforcing member of the present invention.

FIG. 1 is a schematic perspective view showing a reinforcing member of the embodiment. FIG. 2 is an exploded perspective view showing an exploded condition of the reinforcing member shown in FIG. 1. A reinforcing member 101 has a stacked structure 102 having stacked thin iron plate, iron plates 104 for covering openings, and porous bodies 103 such that the stacked structure 102, the iron plates 104, and the porous bodies 103 are closely contacted with each other by sintering.

The stacked structure 102 is a main member of the reinforcing member 101, and has a hollow portion formed therein. The stacked structure 102 has stacked iron plates having openings 106 formed by punching them out. The hollow portion 107 is composed of the openings 106. That is, the hollow portion 107 is formed by stacking the openings 106.

The iron plates 104 for covering the openings are disposed at lower and upper surfaces of the stacked structure 107 so as to seal the hollow portion 107. The porous bodies 103 composed of non-woven fabric of metal fiber are contacted with surfaces of the iron plates 104 for covering the opening, so that the upper and lower surfaces of the reinforcing member 101 are covered with the porous bodies 103.

The reinforcing member 101 of the embodiment has a shape for being applied to a journal portion (bearing portion of a crank shaft) of an engine block. As shown in FIGS. 1 and 2, a semi-circular arc portion 108 is a bearing surface for receiving a shaft. In this embodiment, the hollow portion 107 is formed to have a shape corresponding to that of the bearing surface 108. That is, an inner surface of the hollow portion 107 is similar to a curved surface of the bearing surface 108.

The hollow portion 107 has the above cross-sectional shape in order to secure the volume of the hollow portion 107 as much as possible without losing the strength of the stacked structure 102 as much as possible. Since the hollow portion 107 has the above cross-sectional shape, generation of non-uniform stress due to force applied from the crank shaft thereto via the bearing surface can be prevented, and the strength of the reinforcing member 101 can be maintained at a high level.

The hollow portion 107 has the following function. Since the hollow portion 107 is formed inside the reinforcing member 101, the reinforcing member 101 can be reduced in weight. As a result, the weight increase of the cast product due to the reinforcing member 107 can be inhibited. This is possible in the case in which a light-weight metal such as aluminum alloy is used for a cast material.

The hollow portion 107 inhibits thermal expansion of the cast product in the condition in which the reinforcing member 101 is integrally cast in the cast product. This reason is as follows. That is, although thermal expansion of the reinforcing member 101 exists which is small in comparison with that of the cast material, thermal expansion of the hollow portion 107 is not generated by providing the hollow portion 107. As a result, thermal expansion of the reinforcing member 101 is small. Since the hollow portion is provided inside the reinforcing member in the above manner, the weight increase of the cast product due to use of the reinforcing member can be reduced, and thermal expansion of the cast product can be further reduced.

The function of the porous body 103 will be described hereinafter. The porous bodies 103 contact the upper and the lower surfaces of the reinforcing member 101. The porous bodies 103 are composed of porous fibrous material of non-woven fabric of metal fibers. The adhesion between porous bodies 103 and the cast metal is high since the porous bodies 103 are porous. That is, since the porous bodies 103 are porous, the contact area between each porous body 103 and the cast metal is secured, the cast metal enters into the porous body structure, and enormous number of physical catches of the porous body are microscopically formed on the cast metal. As a result, the adhesion between each porous body and the cast metal is ensured to be high.

Since a portion in which the hollow portion 107 is formed is structured by a stacked structure of punched-out members such as the stacked structure 102, the production cost can be reduced. Although the above portion can be obtained by cutting a block, in this case, the production cost is increased. In this embodiment, although each member is integrally combined by sintering, each member may be secured by brazing and adhesion. The stacked structure 102 may be formed by powder sintering.

2. Structure of Embodiment

Next, one example of a production method for the reinforcing member 101 shown in FIGS. 1 and 2 will be described. First, a production method for the porous bodies 103 will be described. First, a metal fiber (having a diameter of 40 μm) composed of iron material (SS400) was obtained by extracting melted metal. This metallic fiber was formed into a webbing by a pressing machine. The webbing had coating weight of 520 g/m$^2$, and had random fiber orientations in a surface direction. The webbing was worked into non-woven fabric (felt) having pene number (density of the needle punch) of 160 piece/inch$^2$ by a needle punch. Then, six non-woven fabrics of metallic fiber were laminated, so that a porous body 103 was obtained.

Next, a steel plate having a thickness of 1 mm was subjected to punching out, so that an iron plate 105 and an iron plate 104 were obtained, wherein the iron plate 105 had an opening 106 formed thereat, and the iron plate 104 was used for covering the opening 106. The iron plate 104 was different from the iron plate 105 in whether or not the opening 106 was formed thereat.

After the respective members were obtained, the respective members were laminated in the condition as shown in FIG. 2, and were then subjected to compression working by applying a pressure of 200 MPa to them. In this case, the stack number of the stacked structure 102 was 11, the compression working was performed at the above pressure, so that the total thickness thereof was 15 mm. Next, the compressed stacked structure was entered into a vacuum furnace, and was subjected to sintering at a temperature of 1100 degrees C. for two hours. In this manner, a reinforcing member 101 shown in FIG. 1 was obtained. In the case in which the compression working is not performed, hot pressing may be performed in which pressing is simultaneously performed in sintering.

3. Test Results of Embodiment

Figure 3:
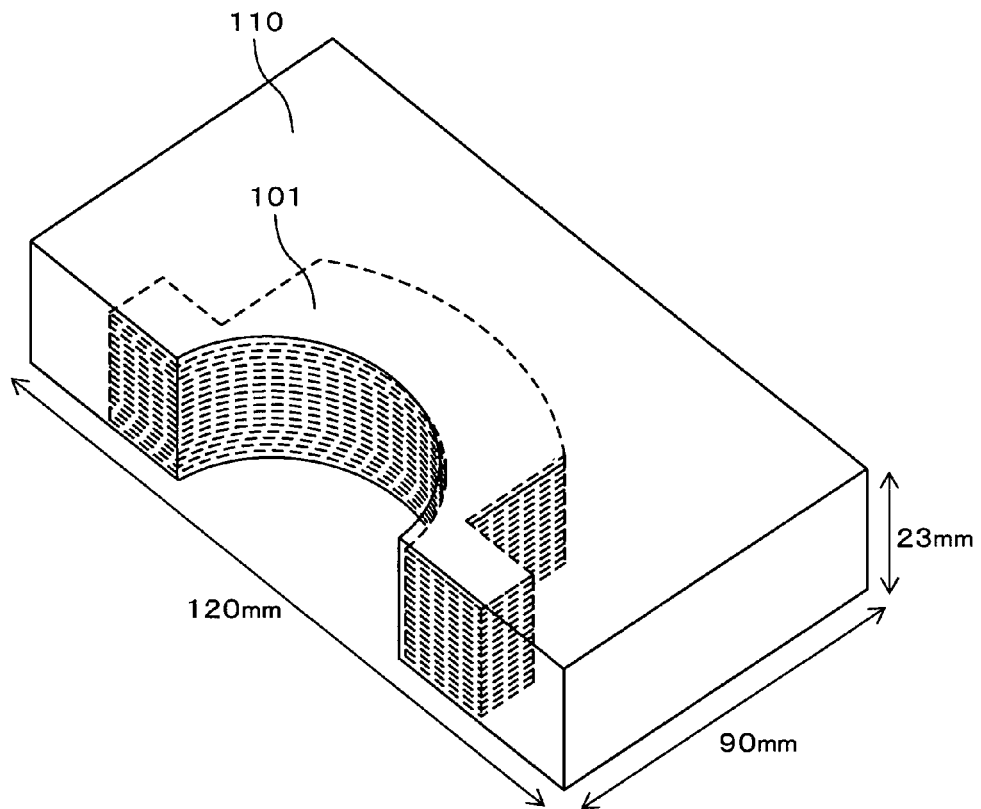
FIG. 3 is a schematic perspective view showing a cast test body using a reinforcing member of the present invention.
Figure 6:
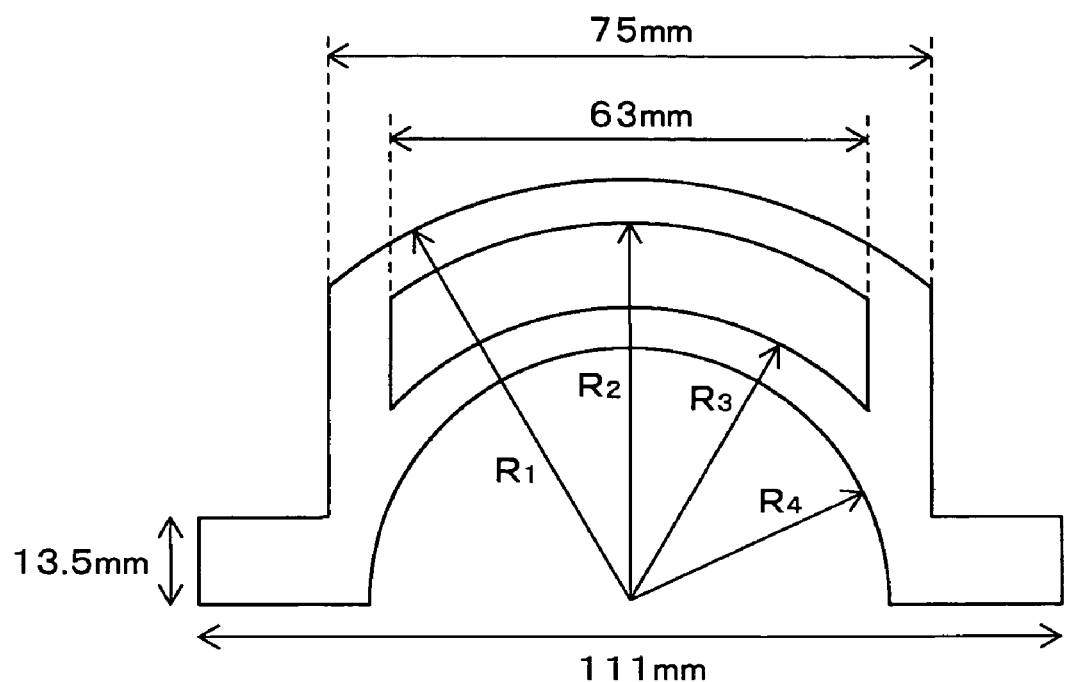
FIG. 6 is a top view showing a size of an iron plate of a reinforcing member.

FIG. 3 is a perspective view showing a cast test body produced by using the reinforcing member 101 of the embodiment. The cast test body shown in FIG. 3 was obtained as follows. FIG. 6 is a top view showing a size of the iron plate 105 of the reinforcing member 101 integrally cast with a cast test body 110.

After the reinforcing member 101 was obtained, the reinforcing member 101 was disposed in a casting die. Melted aluminum having a temperature of 750 degrees C. was poured thereinto at a casting pressure of 100 MPa, so that the cast test body 110 which was composed of aluminum and was reinforced by the reinforcing member 101 was obtained. This cast test body 110 was structured such that overall peripheral surfaces were covered with an aluminum material. The above casting was performed such that the surface of the reinforcing member at a hole portion 113 described hereinafter was covered with the aluminum material having a thickness of 2 mm.

Figure 4:
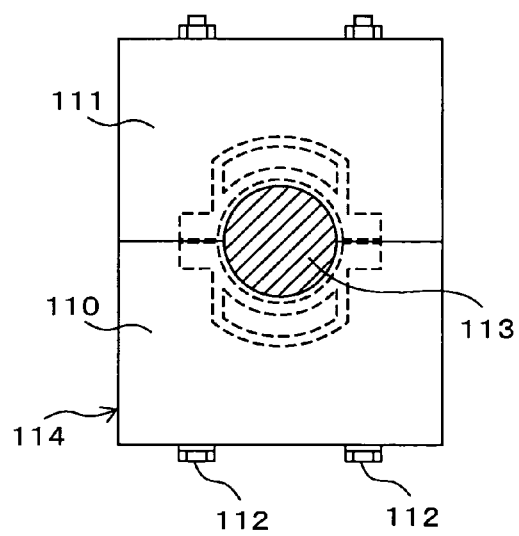
FIG. 4 is a top view of an evaluation sample using the cast test body shown in FIG. 3.

FIG. 4 is a schematic top view showing an evaluation test of expansion degree. The evaluation test was performed as described below. First, a cast test body 111 which was the same as the cast test body 110 shown in FIG. 3 was obtained, two cast test bodies 110 and 111 were faced to each other and combined therewith by a bolt 112 as shown in FIG. 4, so that an evaluation sample 114 (Sample 1) was obtained. Next, the evaluation sample 114 was heated to a temperature of 100 degrees C., and the condition thereof was maintained for thirty minutes. After that, the size of the hole portion 113 was measured, and the thermal expansion rate (%) was evaluated by using the following Numerical Relation 1.

(thermal expansion rate)=100×((area of hole portion at a temperature of 100 degrees C.)−(area of hole portion at a room temperature))/(area of hole portion at a room temperature)   Numerical Relation 1

Sample 114 performed after the above evaluation was cut, a boundary surface (boundary surface of each upper and lower surface) between the reinforcing member 101 and the matrix (aluminum) was observed, and it was observed whether or not the reinforcing member 101 and the matrix (aluminum) were peeled from each other. The test results are shown in Table 1 described below.

TABLE 1

| Sample | Weight of reinforcing member | Thermal expansion rate | Peeling at boundary surface | Notes |
|---|---|---|---|---|
| Sample 1 | 216 g | 0.248% | None | Having hollow portion Having porous body |
| Sample 2 | 293 g | 0.271% | None | No hollow portion Having porous body |
| Sample 3 | 206 g | 0.250% | Existing | Having hollow portion No porous body |
| Comparative Sample 1 | 283 g | 0.274% | Existing | No hollow portion No porous body |
| Comparative Sample 2 | 108 g (#) | 0.294% | — | No reinforcing member |

(#) Weight of aluminum

In Table 1, Sample 2 is a sample using a test body which does not have the hollow portion 107 shown in FIG. 2. In this case, since the hollow portion 107 does not exist, the weight of the reinforcing member is increased. Sample 3 is a sample in which the porous body 103 shown in FIG. 2 is not disposed. Comparative Sample 1 is a sample in which the hollow portion 107 is not formed and the porous portion 103 is not disposed. Comparative Sample 2 is a sample in which the reinforcing member is not used and only the aluminum of the matrix is used.

As shown in Table 1, the reinforcing member 101 is disposed in the cast body, so that the amount of thermal expansion can be reduced. As shown in Samples 1 and 3, by providing the hollow portion 107 in the reinforcing member 101, the amount of thermal expansion can be further reduced in comparison with the case in which the hollow portion 107 is not provided in the reinforcing member 101. Peeling between the reinforcing member 101 and the matrix can be prevented by providing the porous body 103.

4. Application of Embodiment

Figure 5:
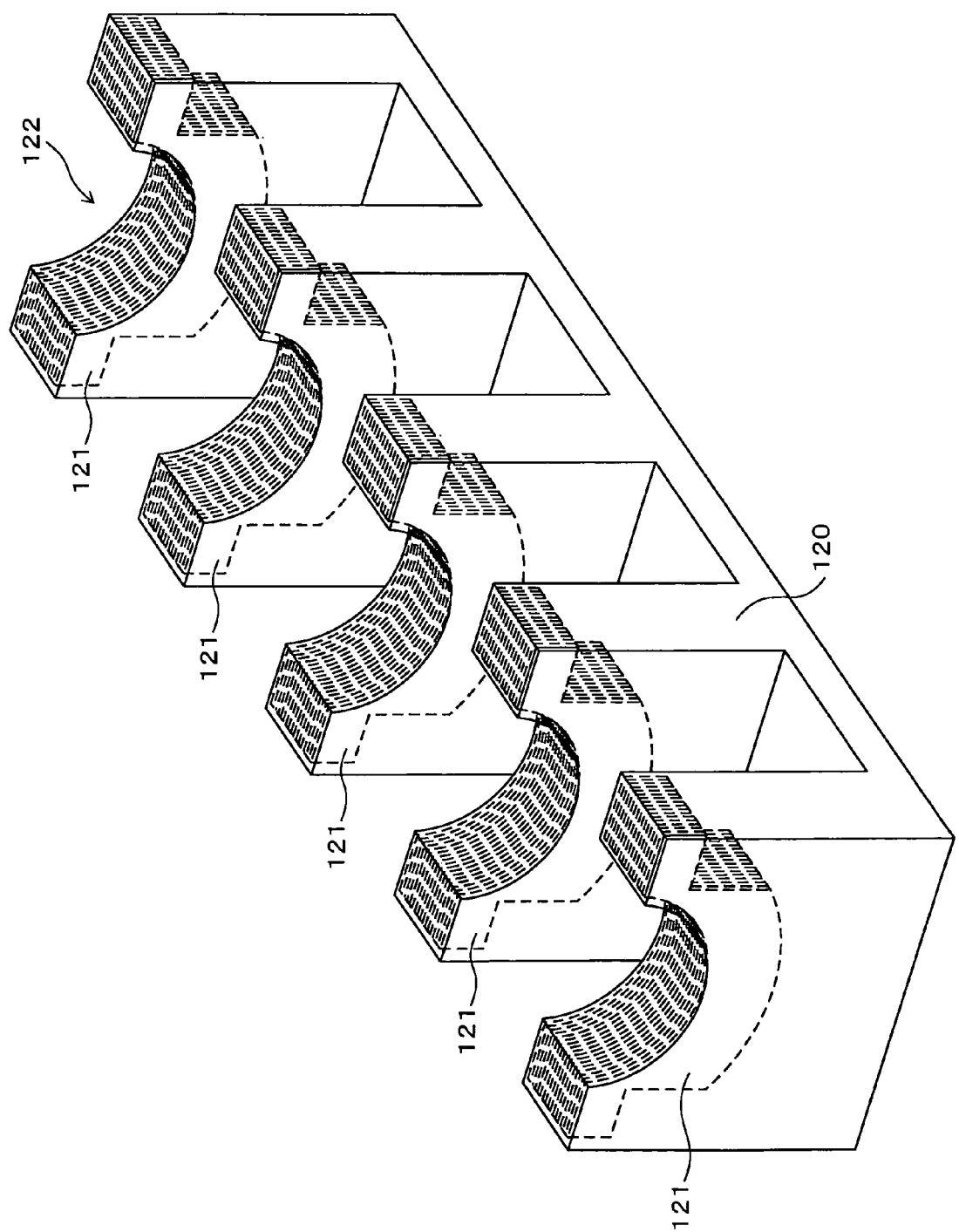
FIG. 5 is a perspective view showing a portion of an engine block using a reinforcing member of the present invention.

FIG. 5 is a portion of an engine block for automobiles using an example of the reinforcing member of the present invention. A portion 120 of an engine block for automobiles of this example is equipped with five journal portions 122. A reinforcing member 121 of the present invention is integrally cast with each journal portion 122. For example, the portion 120 of the engine block is composed of aluminum alloy. In the structure of this example, since the journal portions 122 for receiving a crank shaft are reinforced by the reinforcing member, and the thermal expansion rate is reduced, a light engine block which endures speed rotation and heavy action is provided. Metal (not shown in the Figure) is further applied to the surface of each journal portion 122 for receiving the crank shaft, and functions as a bearing.

The invention claimed is:

1. An engine block comprising a journal portion, the journal portion comprised of a reinforcing member that is integrally cast with a cast metal, the reinforcing member comprising: a material that is different from the cast metal; and a hollow portion; and a porous body covering a portion of the reinforcing member or overall surfaces of the reinforcing member, wherein the cast metal enters into pores of the porous body to secure the cast metal to the porous body.

2. The engine block according to claim 1, wherein the reinforcing member comprises:
   a stacked structure having plated members;
   openings formed at the plated members, the openings forming the hollow portion; and members laminated on both surfaces of the stacked structure and covering the openings.

3. The engine block according to claim 1,
   wherein the hollow portion is a closed space having no member therein.

4. The engine block according to claim 1, wherein the porous body is composed of a porous fibrous material of metal fiber.

5. A production method for a reinforcing member of a journal portion of an engine block, the reinforcing member having a hollow portion that is a closed space having no member therein that is integrally cast with the cast metal, the production method comprising:
   stacking plated members having openings;
   laminating the plated members on an upper member and a lower member of the stacked plated members so as to cover the openings; and
   covering a portion of the reinforcing member or overall surfaces of the reinforcing member with a porous body
   wherein the cast metal enters into pores of the porous body to secure the cast metal to the porous body.

6. The production method for a reinforcing member according to claim 5, wherein the porous body is composed of a porous fibrous material of metal fiber.

* * * * *